(12) United States Patent
Fraim et al.

(10) Patent No.: US 11,231,088 B2
(45) Date of Patent: Jan. 25, 2022

(54) METHOD FOR ENGAGING TWO GEAR ELEMENTS AND DRIVING DEVICE IMPLEMENTING SUCH A METHOD

(71) Applicant: SAFRAN LANDING SYSTEMS, Velizy Villacoublay (FR)

(72) Inventors: Julien Fraim, Moissy-Cramayel (FR); Frédérik Giraud, Moissy-Cramayel (FR); Frédéric Martin, Moissy-Cramayel (FR); Alexandre Veillon, Moissy-Cramayel (FR)

(73) Assignee: SAFRAN LANDING SYSTEMS, Velizy Villacoublay (FR)

( * ) Notice: Subject to any disclaimer, the term of this patent is extended or adjusted under 35 U.S.C. 154(b) by 175 days.

(21) Appl. No.: 16/560,262

(22) Filed: Sep. 4, 2019

(65) Prior Publication Data
US 2020/0072317 A1 Mar. 5, 2020

(30) Foreign Application Priority Data

Sep. 5, 2018 (FR) ...................................... 18 57978

(51) Int. Cl.
*B64C 25/24* (2006.01)
*F16H 1/00* (2006.01)
*B64C 25/40* (2006.01)
*F16H 1/06* (2006.01)

(52) U.S. Cl.
CPC ........... *F16H 1/006* (2013.01); *B64C 25/405* (2013.01); *F16H 1/06* (2013.01)

(58) Field of Classification Search
CPC ......... B64C 25/40; B64C 25/405; F16H 1/06; F16H 1/006; F02N 11/0851

USPC .............................................................. 74/8
See application file for complete search history.

(56) References Cited

U.S. PATENT DOCUMENTS

| | | | |
|---|---|---|---|
| 3,807,664 A * | 4/1974 | Kelly, Jr. | B64C 25/405 244/50 |
| 2012/0312112 A1 | 12/2012 | Tizac | |
| 2014/0260795 A1* | 9/2014 | Gray | F02N 11/0851 74/7 E |

(Continued)

FOREIGN PATENT DOCUMENTS

GB     2 524 763 A     10/2015

OTHER PUBLICATIONS

French Preliminary Search Report for FR 18 57978 dated Jun. 4, 2019.

*Primary Examiner* — Randell J Krug
(74) *Attorney, Agent, or Firm* — Sughrue Mion, PLLC

(57) ABSTRACT

A method for engaging a first gear element with a second gear element is provided. The second gear element is mounted to be mobile between a meshing position and a position of disengagement using an actuator. The method includes driving one or more of the first and second gear elements in rotation to form a non-zero rotation speed difference between the first and second gear elements and controlling the actuator to successively displace the second gear element to the meshing position, and when an intermediate position of the second gear element is detected, stop the displacement of the second gear element, and when an angular position of engagement of the first and second gear elements is detected, displace the second gear element to the meshing position.

10 Claims, 4 Drawing Sheets

(56) References Cited

U.S. PATENT DOCUMENTS

2016/0039519 A1\* 2/2016 Didey ................. F16H 1/06
 244/103 S
2017/0106974 A1\* 4/2017 Morris ............. B64C 25/405

\* cited by examiner

METHOD FOR ENGAGING TWO GEAR ELEMENTS AND DRIVING DEVICE IMPLEMENTING SUCH A METHOD

The present invention relates to the field of the motorized transmission of movements and more particularly a method for engaging two gear elements. The invention relates also to a driving device, in particular, although not exclusively, an aircraft wheel implementing such a method.

TECHNOLOGICAL BACKGROUND OF THE INVENTION

In the field of aviation, provision is now made to equip aircraft with members for driving wheels in rotation to allow the displacement on the ground of the aircraft without using its power plants. Driving members mounted on a landing gear are described in the documents WO 2011/023505 and WO 2015/033160. These driving members comprise an electric motor linked to a reducing gear whose output is equipped with a roller pinion. The pinion cooperates with a toothed crown ring secured to the aircraft wheel. In this way, the electric motor drives the pinion in rotation, which in turn drives the toothed crown ring and therefore the wheel to displace the aircraft.

For issues of safety, provision is made, in particular when the aircraft is taking off and landing, to separate the pinion and the toothed crown ring. For that, actuation means ensure the displacement of the pinion between a position of disengagement in which the pinion is away from the toothed crown ring, and a meshing position in which the pinion drives said crown ring in rotation.

However, when the pinion is rotationally engaged on the crown ring, a peripheral portion of at least one of the rollers of said pinion risks striking upper portions of teeth of the crown ring, which creates significant occasional loads transmitted to all of the driving members but also to the structure of the landing gear of the aircraft. To avoid any degradation of these driving members (such as, for example, the breaking of a tooth of the crown ring or even the malfunctioning of a roller of the pinion), said members are generally overdimensioned, which leads to an increase in the weight and the cost of said members.

OBJECT OF THE INVENTION

The object of the invention is therefore to propose a means for limiting the loads transferred through two gears upon their coupling, and to at least partly overcome the abovementioned drawbacks.

SUMMARY OF THE INVENTION

To this end, the invention proposes a method for engaging a first gear element with a second gear element, at least the second gear element being mounted to be mobile between a meshing position and a position of disengagement using an actuator.

According to the invention, the engagement method comprises the step of driving at least one of the gear elements in rotation to form a non-zero rotation speed difference between said gear elements. The method also comprises the step of controlling the actuator to successively:
displace at least the second gear element to the meshing position,
when an intermediate position of the second gear element in proximity to the first gear element is detected, in which said second gear element remains sufficiently far away from the first gear element to prevent any contact between them, stop the displacement of the second gear element,
when an angular position of mutual engagement of said gear elements is detected in which the second gear element is substantially in phase with the first gear element to mesh the latter, displace said second gear element to the meshing position.

Thus, the displacement of the second gear element is stopped when it is detected in proximity to the first gear element, which makes it possible to bring the gear elements as close together as possible without risking a contact between them and wait for said gear elements to be in phase before bringing the second gear element into the meshing position. The engagement travel and therefore the meshing time are thus reduced and the risk of an impact is limited, even eliminated.

According to a preferred embodiment of the invention, the actuator comprises a cylinder having a rod driven by a servo valve and linked to the second gear element. Thus:
an increase in the flow rate in the servo valve makes it possible to achieve a predetermined pressure and to displace the rod of the cylinder to the meshing position,
a position sensor makes it possible to detect the intermediate position of the second gear element relative to the first gear element, a modification of the flow rate of the servo valve then making it possible to stop the displacement of the rod of the cylinder,
a first sensor of angular position of the first gear element and a second sensor of angular position of the second gear element make it possible to detect the ideal angular position of engagement of said gear elements, an increase in the flow rate in the servo valve to a maximum flow rate then making it possible to bring the rod of the cylinder to the meshing position.

The invention relates also to a driving device comprising:
a first gear element,
a second gear element that is mobile between a position of meshing with the first gear element and a position of disengagement using an actuator,
a motor driving one of the gear elements in rotation,
first means for detecting an intermediate position of the second gear element relative to the first gear element,
second means for detecting an angular position difference between the first gear element and the second gear element,
an electronic control unit linked to the actuator, to the motor, to the first detection means and to the second detection means.

According to the invention, the control unit is arranged to implement the above method.

According to a preferred embodiment of the invention, the actuator comprises a cylinder having a rod linked to the second gear element, a servo valve drives the cylinder, the first detection means comprise a sensor of position of the rod and the second detection means comprise a sensor of angular position of the first gear element and a sensor of angular position of the second gear element.

Particularly, the sensor of angular position of the first gear element and the sensor of angular position of the second gear element are Hall effect sensors.

According to a particular feature, the cylinder is a hydraulic cylinder.

According to another particular feature, the motor is an electric motor.

According to a preferred embodiment of the invention, the first gear element is a toothed crown ring and the second gear element is a roller pinion.

Particularly, the toothed crown ring is secured to a wheel.

The invention relates also to a landing gear equipped with such a device.

DESCRIPTION OF THE FIGURES

The invention will be better understood in light of the following description, which is purely illustrative and non-limiting, and should be read with respect to the attached figures, in which.

DETAILED DESCRIPTION OF A PARTICULAR EMBODIMENT OF THE INVENTION

Figure 1:
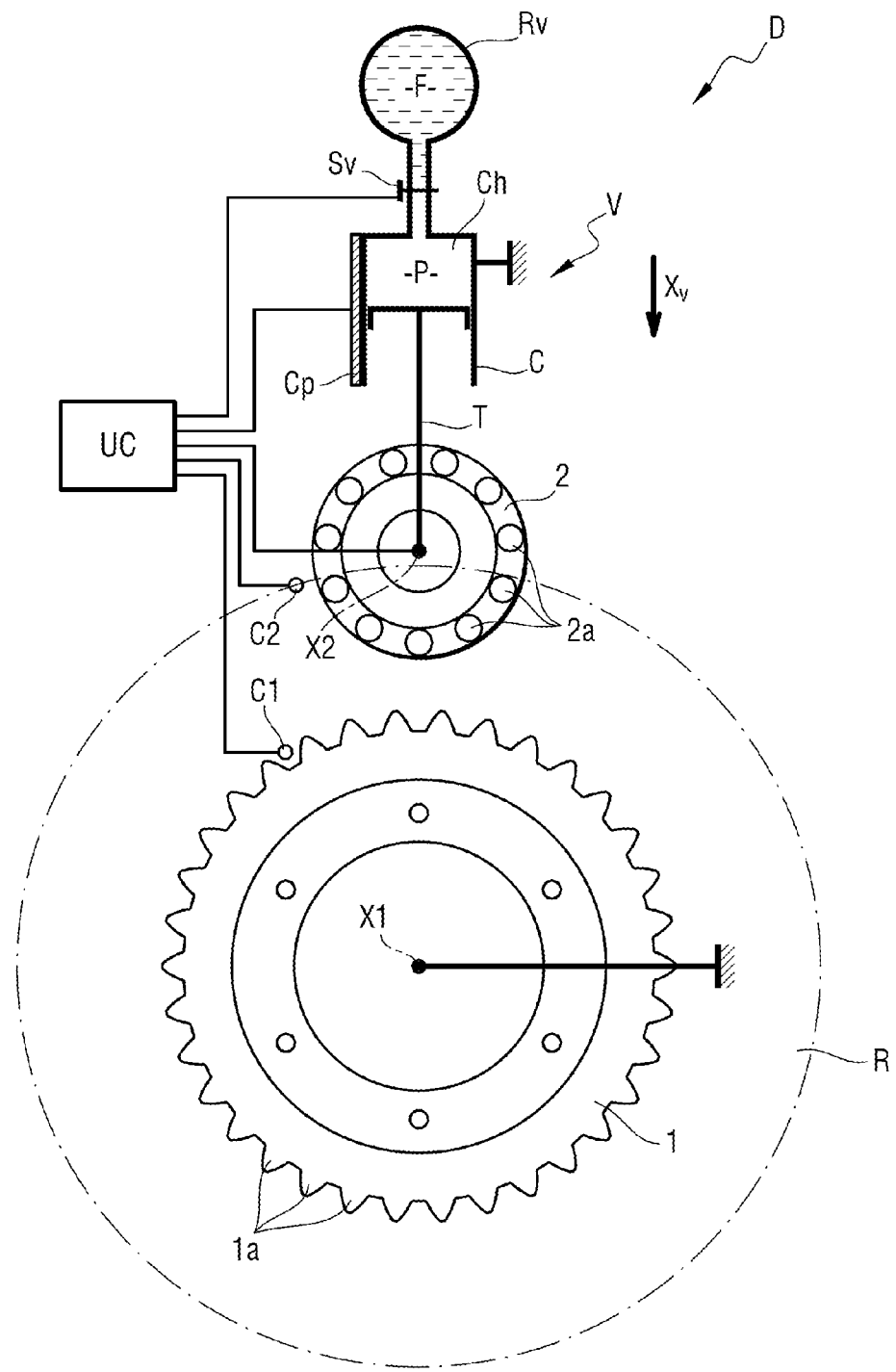
FIG. 1 schematically represents a driving device according to a particular embodiment of the invention, the second gear element being in the position of disengagement.

Referring to FIG. 1, a landing gear of an aircraft is equipped with a driving device D according to a particular embodiment of the invention. The landing gear comprises a leg comprising a caisson provided with means for linking it to the structure of the aircraft and a rod sliding in the caisson and having a free end provided with a hub of a wheel R.

The driving device D comprises a toothed crown ring 1 comprising a row of teeth 1a. The crown ring 1 forms a first gear element secured to the wheel R of the aircraft, the crown ring 1 and the wheel R having one and the same axis of rotation X1.

The driving device D also comprises a pinion 2 comprising a plurality of rollers 2a evenly distributed about an axis of rotation X2 which is parallel to the axis of rotation X1. The pinion 2 with rollers 2a forms a second gear element secured to an output shaft of a reducing gear associated with an electric motor.

The pinion 2 is linked at the axis of rotation X2 to a free end of a rod of a hydraulic cylinder V. The cylinder V comprises a body C secured to the landing gear and inside which the rod T can be displaced along an axis Xv orthogonal to the axes of rotation X1, X2. One end of the piston-forming rod T delimits, with the body C of the cylinder, a chamber Ch. The chamber Ch is connected via a servo valve Sv to a tank Rv containing a fluid F under pressure. The servo valve Sv makes it possible to regulate a pressure P inside the chamber Ch of the cylinder V, i.e. a displacement Dp of the rod T.

Figure 2A:
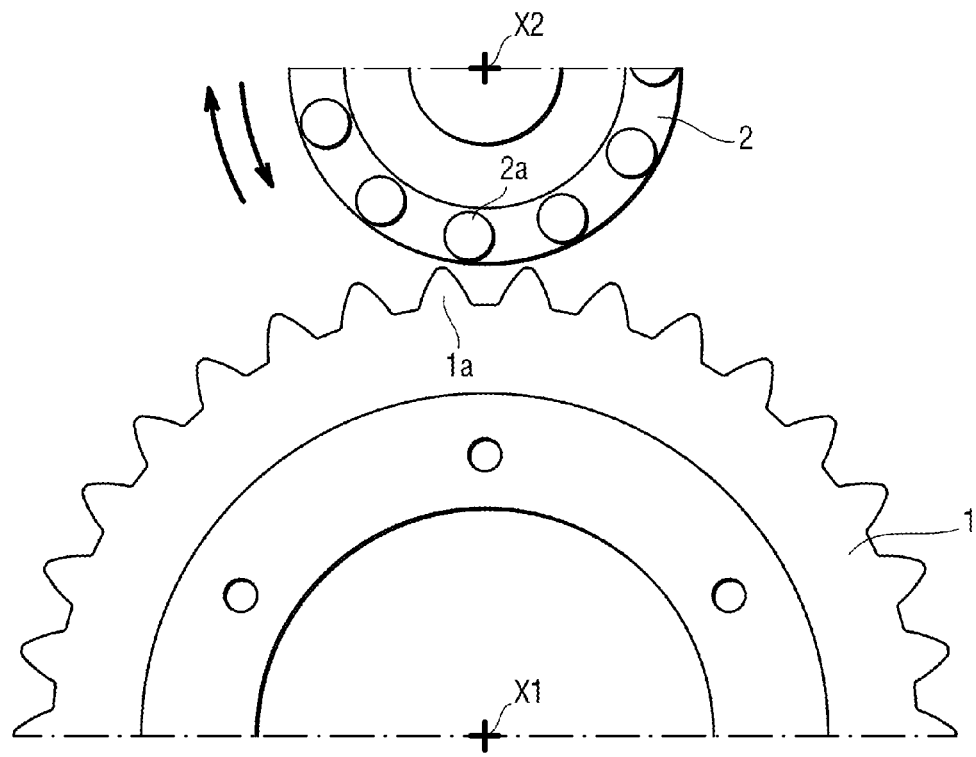
FIG. 2a is a partial view of the device illustrated in FIG. 1 in which the second gear element is in the advanced position.
Figure 2B:
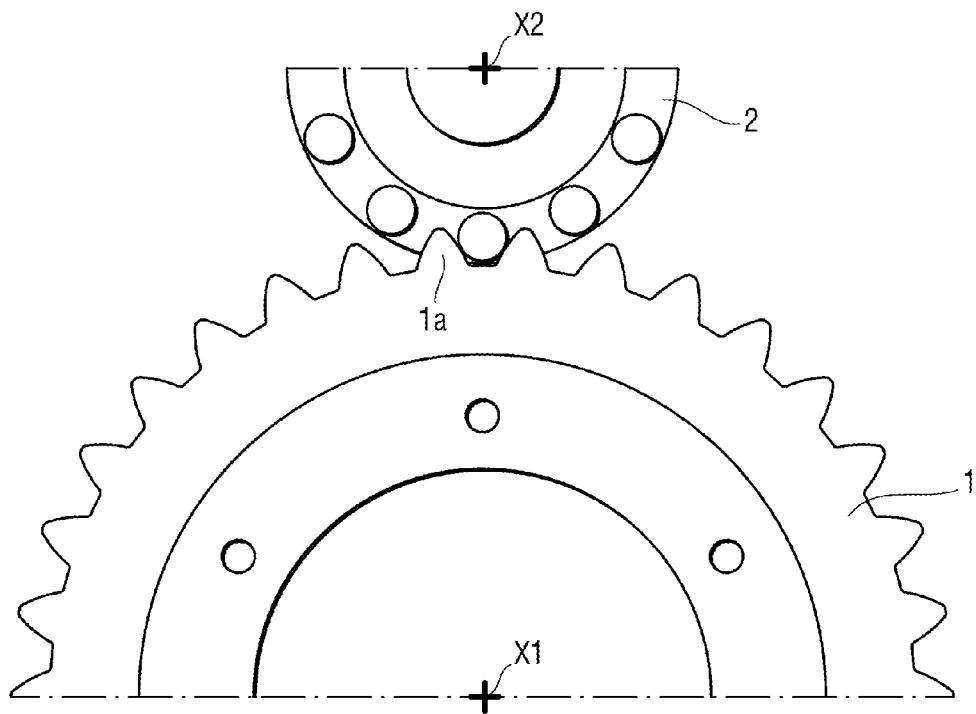
FIG. 2b is a partial view of the device illustrated in FIG. 1 in which the second gear element is in the meshing position, FIG. 3 schematically represents the method of the invention.

The pinion 2 is thus mounted to be mobile between a position of disengagement illustrated in FIG. 1 in which the pinion 2 is away from the crown ring 1, and a meshing position illustrated in FIG. 2b in which the pinion 2 is in phase with the crown ring 1 to mesh the latter.

The cylinder V is equipped with an electromagnetic sensor Cp extending along the body C of the cylinder to detect the magnetic field of a permanent magnet incorporated in the end of the piston-forming rod T. To that end, the sensor Cp makes it possible to determine the position of the rod T along the axis Xv.

The driving device D comprises a Hall effect sensor C1 secured to the structure of the electric motor and in front of which the teeth 1a of the crown ring 1 run in rotation. The detection of the presence of teeth 1a through the sensor C1 makes it possible to determine an angular position of the crown ring 1 relative to the axis of rotation X1.

The driving device D also comprises a Hall effect sensor C2 secured to the rod T of the cylinder V and in front of which the rollers 2a of the pinion 2 run in rotation. The detection of the presence of rollers 2a through the sensor C2 makes it possible to determine an angular position of the pinion 2 relative to the axis of rotation X2.

Through the comparison of their change of state, the sensors C1, C2 form means for detecting an angular position difference between the crown ring 1 and the pinion 2.

An electronic control unit UC is linked to the servo valve Sv, to the electric motor driving the pinion 2 in rotation, to the sensor Cp of position of the rod and to the sensors C1, C2 of angular position of the gear elements 1, 2.

The method for engaging the pinion 2 with the crown ring 1 will now be detailed.

Figure 3:
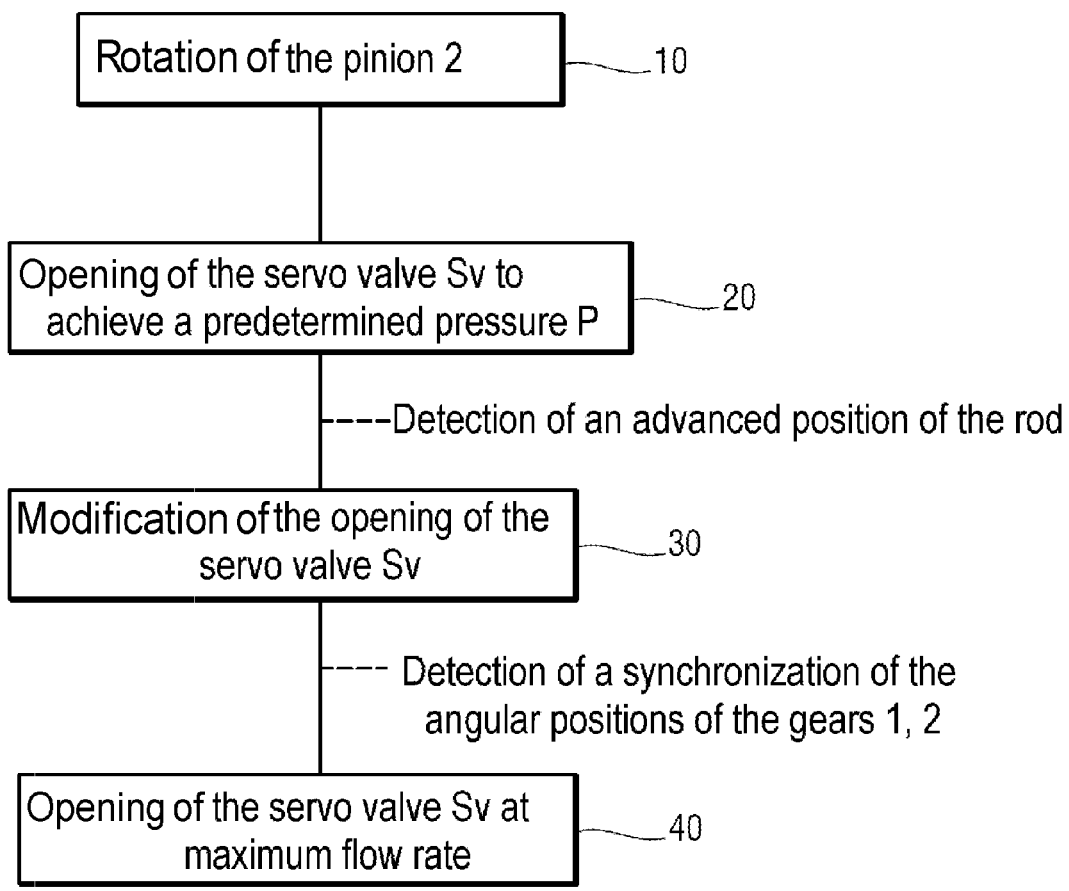

As illustrated in FIG. 3, a first step 10 consists in that the control unit UC controls the electric motor to drive the pinion 2 in rotation so as to form a non-zero speed difference between said pinion 2 and the crown ring 1. The speed difference is preferentially greater than 3 rpm (revolutions per minute) to avoid having a roller 2a of the pinion 2 permanently facing a tooth 1a of the crown ring 1. This state corresponds substantially to the absolute value sum of the inaccuracies on the measurements and the controls of the rotation speeds of the pinion 2 and the crown ring 1. It may also be preferable to limit this speed difference or even the torque delivered by the electric motor to minimize the loads at the moment of contact between the crown ring 1 and the pinion 2 This limitation can in particular be determined as a function of the architecture of the pinion 2 and of the crown ring 1 or even of the performance levels sought for the driving device D. Nevertheless, the greater the speed difference is between the crown ring 1 and the pinion 2, the shorter the time is during which an engagement without impact between said crown ring 1 and said pinion 2 can be envisaged. Thus, a speed difference substantially equal to 4 rpm and a maximum torque of 1800 Newton-metres are preferred.

In a second step 20, the flow rate of the servo valve Sv is increased by the control unit UC to achieve, in the chamber Ch of the cylinder V, a pressure P that is sufficient to displace the rod T of the cylinder V. The pinion 2 is then displaced at a substantially constant speed to the meshing position until the control unit UC detects, via the position sensor Cp, an intermediate position of the rod T. The sensor Cp can be a position sensor or a distance sensor making it possible to detect the arrival of the pinion 2 in the intermediate position of the rod T.

Consequently, the control unit UC modifies, in a third step 30, the flow rate of the servo valve Sv so as to stop the advancement of the rod T towards the meshing position. The aim of the third step 30 is to bring the pinion 2 as close as possible to the crown ring 1 while keeping a large enough space between them to prevent any contact while waiting for said pinion 2 and said crown ring 1 to be in phase to bring the pinion 2 into the meshing position. The remaining distance to be travelled by the rod T to bring the pinion 2 into meshing position is then reduced to the minimum. The intermediate position of the rod T is defined by taking into account the characteristics of the different elements that make up the driving device D to avoid any chance contact of the pinion 2 and of the crown ring 1, for example because of vibrations and/or impacts undergone by the landing gear and more particularly by said components. The characteristics taken into account comprise:

- the deformability of the elements that make up the driving device D;
- the mounting and operating plays of these elements and more particularly of the rod T, of the crown ring 1 and of the pinion 2;
- the accuracy of the position sensor Cp;
- the accuracy of the control chain including the control unit UC and the servo valve Sv; and
- the positional accuracy of the cylinder V.

The control unit UC then compares the changes of state of the sensors C1, C2 of angular position of the crown ring 1 and of the pinion 2. As soon as the control unit UC observes an appropriate synchronization of the angular positions of the crown ring 1 and of the pinion 2, the flow rate of the servo valve is then, in a fourth step 40, increase to a maximum flow rate so as to displace the rod T as rapidly as possible to the meshing position in order for said rod T to travel the remaining distance to bring the pinion 2 into meshing position before the end of the time during which an engagement without impact is possible. A maximum flow rate substantially equal to 10 litres per minute is preferred. The appropriate synchronization of the angular positions of the crown ring 1 and of the pinion 2 corresponds for example to a moment at which a tooth 1a of the crown ring 1 is substantially facing a hollow formed between two rollers 2a of the pinion 2, or even to a moment at which a roller 2a of the pinion 2 is substantially facing a hollow formed between two teeth 1a of the crown ring 1.

Since the pinion 2 is then substantially in phase with the crown ring 1, the rapid displacement Dp of the rod T of the cylinder V allows the pinion 2 to reach the meshing position. Consequently, the pressure P inside the chamber Ch of the cylinder V increases to reach substantially the pressure of the fluid F contained in the tank Rv.

Figure 4:
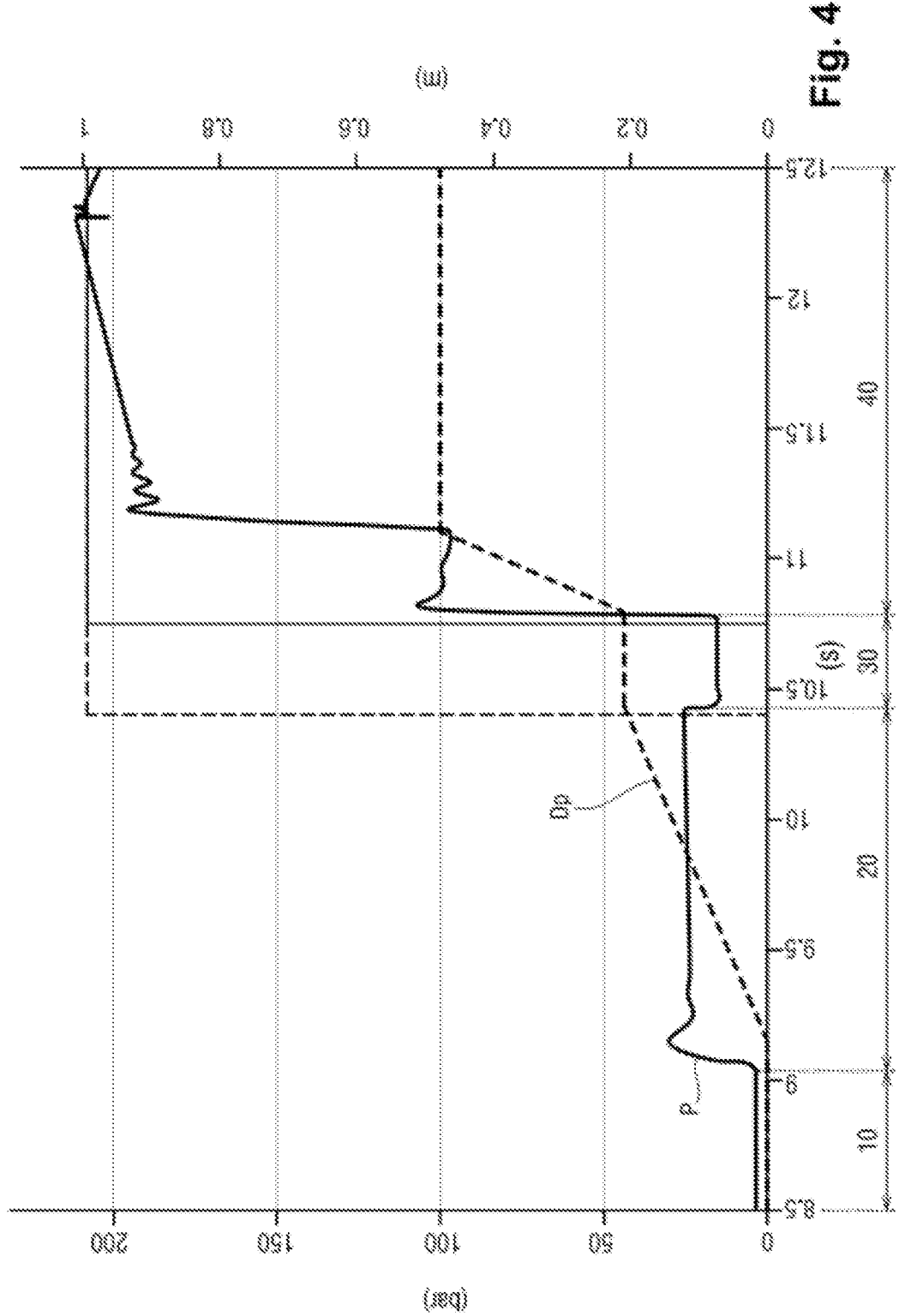
FIG. 4 represents, over time, the displacement of the rod of the cylinder and the pressure prevailing inside the cylinder upon the implementation of the method of the invention illustrated in FIG. 3.

FIG. 4 illustrates the displacement Dp of the rod T of the cylinder V between the position of disengagement and the meshing position, and the trend of the pressure P inside the chamber Ch of the cylinder V during the steps 10, 20, 30, 40.

Obviously, the invention is not limited to the embodiment described but encompasses any variant falling within the scope of the invention as defined by the claims.

The position of the pinion 2 and of the crown ring 1 in the driving device D can in particular be reversed.

Although here the second gear element is a roller pinion, another type of pinion can be envisaged, such as a pinion equipped with teeth for example.

Although here the movement to engage the pinion with the crown ring is a translational movement, a rotational movement can also be envisaged.

The axis Xv along which the rod T of the cylinder V is displaced may not be orthogonal to the axis of rotation X1 of the toothed crown ring.

Similarly, while the engagement between the pinion and the crown ring is, here, radial, it can perfectly well be axial or tangential (case in particular of bevel gears).

Although here the cylinder V is here hydraulic, the use of a pneumatic cylinder associated with a solenoid valve can equally be envisaged for an operation similar to the embodiment described.

It is also possible to replace the cylinder V and the servo valve Sv with an electromechanical actuator, such as, for example, an electric motor associated with a mechanical chain linked to the pinion. The immobilizing of the motor in position or at zero speed then makes it possible to stop the displacement of the pinion.

The determination of the angular position of the crown ring 1 and/or of the pinion 2 can also be performed via incremental rotary coders.

Although here the sensor Cp of position of the rod T is electromagnetic, other types of sensor can be chosen as a function of the architecture of the driving device and of the associated constraints (hydraulic, pneumatic, electromechanical, electrical, optical or optronic, etc.). It is also possible to perform a measurement of distance, in particular between the outer diameter of the crown ring and that of the pinion.

The invention claimed is:

1. A method for engaging a first gear element with a second gear element, at least the second gear element being mounted to be mobile between a meshing position and a position of disengagement using an actuator, the method comprising the step of driving at least one of the first gear element and the second gear element in rotation to form a non-zero rotation speed difference between the first gear element and the second gear element and a step of controlling the actuator to successively:
   - displace at least the second gear element towards the meshing position,
   - when an intermediate position of the second gear element in proximity to the first gear element is detected, in which the second gear element remains sufficiently far away from the first gear element to prevent any contact between them, stop the displacement of said second gear element,
   - when an angular position of mutual engagement of the first gear element and the second gear element is detected in which the second gear element is substantially in phase with the first gear element to mesh the latter, displace said second gear element to the meshing position.

2. The method according to claim 1, in which the actuator comprises a cylinder having a rod driven by a servo valve and linked to the second gear element, and in which:
   - an increase in the flow rate in the servo valve makes it possible to achieve a predetermined pressure and to displace the rod of the cylinder to the meshing position,
   - a position sensor makes it possible to detect the intermediate position of the second gear element relative to the first gear element, a modification of the flow rate of the servo valve then making it possible to stop the displacement of the rod of the cylinder,
   - a first sensor of angular position of the first gear element and a second sensor of angular position of the second gear element make it possible to detect the angular position of engagement of the first gear element and the second gear element, an increase in the flow rate in the servo valve to a maximum flow rate then making it possible to bring the rod of the cylinder to the meshing position.

3. A driving device, comprising a first gear element, a second gear element that is mobile between a position of meshing with the first gear element and a position of disengagement with the first gear element using an actuator, a motor driving one of the first gear element and the second gear element in rotation, first detection means for detecting of an intermediate position of the second gear element relative to the first gear element, second detection means for detecting an angular position difference between the first gear element and the second gear element, an electronic control unit linked to the actuator, to the motor, to the first detection means and to the second detection means, wherein the electronic control unit is arranged to implement the method according to claim 1.

4. The driving device according to claim 3, in which the actuator comprises a cylinder having a rod linked to the second gear element, a servo valve drives the cylinder, the first detection means comprise a sensor of position of the rod and the second detection means comprise a sensor of angular position of the first gear element and a sensor of angular position of the second gear element.

5. The driving device according to claim 4, in which the sensor of angular position of the first gear element and the sensor of angular position of the second gear element are Hall effect sensors.

6. The driving device according to claim 4, in which the cylinder is a hydraulic cylinder.

7. The driving device according to claim 3, in which the motor is an electric motor.

8. The driving device according to claim 3, in which the first gear element is a toothed crown ring and the second gear element is a roller pinion.

9. The driving device according to claim 8, in which the toothed crown ring is secured to a wheel.

10. A landing gear equipped with a driving device according to claim 3.

* * * * *